United States Patent
Goswami et al.

(10) Patent No.: US 11,010,954 B2
(45) Date of Patent: May 18, 2021

(54) EFFICIENT REDUNDANT COVERAGE DISCARD MECHANISM TO REDUCE PIXEL SHADER WORK IN A TILE-BASED GRAPHICS RENDERING PIPELINE

(71) Applicant: Samsung Electronics Co., Ltd., Suwon-si (KR)

(72) Inventors: Nilanjan Goswami, Livermore, CA (US); Derek Lentz, Reno, NV (US); Adithya Hrudhayan Krishnamurthy, San Jose, CA (US); David C. Tannenbaum, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 36 days.

(21) Appl. No.: 16/438,446

(22) Filed: Jun. 11, 2019

(65) Prior Publication Data

US 2020/0184715 A1 Jun. 11, 2020

Related U.S. Application Data

(60) Provisional application No. 62/778,286, filed on Dec. 11, 2018.

(51) Int. Cl.
*G06T 15/00* (2011.01)
*G06T 15/80* (2011.01)
(Continued)

(52) U.S. Cl.
CPC ............ *G06T 15/005* (2013.01); *G06F 13/10* (2013.01); *G06T 11/40* (2013.01); *G06T 15/10* (2013.01); *G06T 15/503* (2013.01); *G06T 15/80* (2013.01)

(58) Field of Classification Search
CPC ....... G06F 13/10; G06T 15/005; G06T 15/10; G06T 15/503; G06T 15/80; G06T 11/40; G06T 1/20; G06T 1/60
See application file for complete search history.

(56) References Cited

U.S. PATENT DOCUMENTS 5,371,514 A 12/1994 Lawless et al.
7,626,588 B1 * 12/2009 Molnar ............... G06F 12/0802
345/557

(Continued)

OTHER PUBLICATIONS

Anglada, Marti et al., "Rendering Elimination: Early Discard of Redundant Tiles in the Graphics Pipeline", Conference: 2019 IEEE International Symposium on High Performance Computer Architecture (HPCA), at Washington, DC, USA, Jul. 25, 2018, 12 pages.

*Primary Examiner* — Daniel F Hajnik
(74) *Attorney, Agent, or Firm* — Renaissance IP Law Group LLP

(57) ABSTRACT

A computer-implemented redundant-coverage discard method and apparatus for reducing pixel shader work in a tile-based graphics rendering pipeline is disclosed. A coverage block information (CBI) FIFO buffer is disposed within an early coverage discard (ECD) logic section. The FIFO buffer receives and buffers coverage blocks in FIFO order. At least one coverage block that matches the block position within the TCPM is updated. The TCPM stores per-pixel primitive coverage information. The FIFO buffer buffers a moving window of the coverage blocks. Incoming primitive information associated with the coverage blocks is compared with the per-pixel primitive coverage information stored in the tile coverage-primitive map (TCPM) table at the corresponding positions for the live coverages only. Any preceding overlapping coverage within the moving window of the coverage blocks is rejected. An alternate embodiment uses a doubly linked-list rather than a FIFO buffer.

16 Claims, 16 Drawing Sheets

(51) Int. Cl.
*G06T 15/50* (2011.01)
*G06T 11/40* (2006.01)
*G06F 13/10* (2006.01)
*G06T 15/10* (2011.01)

(56) References Cited

U.S. PATENT DOCUMENTS

| | | |
|---|---|---|
| 9,214,006 B2 | 12/2015 | Heggelund et al. |
| 2012/0069021 A1* | 3/2012 | Son .................... G06T 15/40 345/426 |
| 2012/0281004 A1* | 11/2012 | Shebanow ............ G09G 5/36 345/557 |
| 2015/0325037 A1* | 11/2015 | Lentz .................... G06T 15/10 345/419 |
| 2016/0098856 A1 | 4/2016 | Broadhurst et al. |
| 2018/0165872 A1* | 6/2018 | Lefebvre ................ G06T 11/40 |

* cited by examiner

PRIMITIVE INFORMATION TABLE (PIT)

| INDEX | Az | Bz | Cz | META-DATA |
|---|---|---|---|---|
| 1 | | | | |
| 2 | | | | |
| ... | | | | |
| N | | | | |

FIG. 7

TCPM VALID TABLE (TVT)

| TABLE INDEX | VALID COVERAGE MASK |
|---|---|
| POSITION {X, Y} | VALID |
| 1 | |
| ... | |
| N | |

FIG. 8

TILE COVERAGE-TO-PRIMITIVE MAP (TCPM) TABLE

| TABLE INDEX | TABLE FIELD | TABLE FIELD | TABLE FIELD | ... | TABLE FIELD | TABLE FIELD |
|---|---|---|---|---|---|---|
| POSITION (X, Y) | INDEX TO PIT 0 | INDEX TO PIT 1 | ... | INDEX TO PIT 14 | INDEX TO PIT 15 |
| 1 | | | | | | |
| ... | | | | | | |
| N | | | | | | |

FIG. 9

CBI LOGIC SECTION TABLE CONTENT DETAILS

| FIELD | CONTENTS |
|---|---|
| X | X LOCATION OF 4×4 BLOCK IN TILE |
| Y | Y LOCATION OF 4×4 BLOCK IN TILE |
| PRIM START | FIRST COVERAGE FOR A PRIMITIVE |
| PRIM END | LAST COVERAGE FOR A PRIMITIVE |
| DISABLE TCM | DISABLE TCM USAGE |
| CONTROL ENTRY | CONTROL ENTRY |
| INDEX TO PIT | INDEX TO PRIMITIVE INFORMATION TABLE FOR THE COVERAGE (WHEN QM IS INTEGRATED WITH ECD) |

FIG. 10

CBI LINKED-LIST CONTENTS 1605

| ENTRY | PREVIOUS NODE | NEXT NODE | CONTROL PAYLOAD |
|---|---|---|---|
| 0 | | | |
| 1 | | | |
| ... | | | |
| N-1 | | | |

FIG. 15

POSITION TO LIST MAP TABLE (PLMT) 1570

| TABLE INDEX | LIST VALID? | LINKED-LIST HEAD |
|---|---|---|
| 1 | | |
| 2 | | |
| ... | | |
| N | | |

FIG. 16

EFFICIENT REDUNDANT COVERAGE DISCARD MECHANISM TO REDUCE PIXEL SHADER WORK IN A TILE-BASED GRAPHICS RENDERING PIPELINE

RELATED APPLICATION DATA

The present application claims the benefit of U.S. Provisional Application Ser. No. 62/778,286, filed on Dec. 11, 2018, the contents of which are hereby incorporated by reference.

BACKGROUND

The present disclosure relates to graphics processing units (GPUs), and more particularly, to a device and method for reducing pixel shader work in a tile-based graphics rendering pipeline of a GPU.

GPUs are specialized devices that accelerate the processing of computer generated graphics. GPUs are also used in a variety of modern-day computing environments such as neural networks, artificial intelligence (AI), high performance systems, autonomous vehicles, mobile devices, gaming systems, and the like. Hidden surface removal (HSR) is a conventional part of the GPU hardware. Pixel shading is one of the most power-hungry and time-consuming tasks of graphics frame rendering in a GPU. HSR helps by reducing overdraw, that is the unnecessary rendering of pixels which will be completely overwritten by following pixels and thus not contribute to the final image. As a result, overall frame processing performance is improved. In addition, reduced pixel shading saves energy consumption. However, conventional approaches to HSR and pixel shading reduction still lack the necessary performance and energy savings needed by ever-increasing computational demands in complex technology environments.

BRIEF SUMMARY

Embodiments may include a computer-implemented redundant-coverage discard method and apparatus for reducing pixel shader work in a tile-based graphics rendering pipeline. Even though the terms "redundant-quad" or "quad" are sometimes used herein, it will be understood that the embodiments disclosed herein can include a redundant-pixel(s) and/or redundant-sample(s) method and apparatus without departing from the inventive concepts disclosed herein. Rasterization produces "live coverage" from primitives, which is partitioned into coverage blocks which hold pixels, samples, quads or larger blocks of them such as 4×4 blocks of pixels. It will be understood that any size coverage block may be used without departing from the inventive concepts disclosed herein. Powers of 2 in width and height (e.g., 8×4) are preferred but are not mandatory. A coverage block may be the output of rasterization, which converts graphics primitives to bitmasks that define which pixels or samples in a rendered image are covered by a primitive. "Live coverage" is the collection of pixels (or samples) produced by the rasterization process and compared against the current depth buffer at the time of rasterization. Thus, "live coverage" is the initial coverage that may be used as an input. A coverage block information (CBI) logic section that may include a first-in-first-out (FIFO) buffer or a doubly linked-list is disposed within an early coverage discard (ECD) logic section. Depth testing may be performed before coverage blocks enter the ECD logic section. The CBI logic section may receive and buffer coverage blocks in FIFO order.

A tile coverage-to-primitive map (TCPM) holds an entry per pixel or sample location within the tile. This entry is the primitive identifier of the input coverage block that last wrote to the TCPM and controls which live pixels or samples are allowed to exit the ECD logic section and continue in the rendering process. Live input coverage blocks update the TCPM with latest coverage-to-primitive mapping, which eventually gets translated into erased coverage for older coverage blocks as they exit the CBI logic section. As the coverage entries exit the CBI logic section, it compares against the most recently written primitive identifiers in the TCPM at the corresponding positions with its own primitive identifier; on mismatch it erases its coverage. The CBI logic section buffers a moving window of the coverage blocks in a FIFO buffer. Any preceding overlapping coverage within the moving window of the coverage blocks may be rejected. A feature may be included to disable CBI coverage erasure at the output of the ECD logic section. A primitive information table (PIT) may further be included in the ECD logic section to hold primitive related information, as well as other control information, that is required by processing performed after the ECD logic section.

BRIEF DESCRIPTION OF THE DRAWINGS

The foregoing and additional features and advantages of the present inventive principles will become more readily apparent from the following detailed description, made with reference to the accompanying figures, in which:

FIG. 7 is an example primitive information table (PIT) in accordance with some embodiments.

FIG. 8 is an example TCPM valid table (TVT) in accordance with some embodiments.

FIG. 9 is an example TCPM table in accordance with some embodiments.

FIG. 10 includes details of contents of an example CBI logic section table in accordance with some embodiments.

FIG. 15 shows example details of the linked-list of FIG. 13 in accordance with some embodiments.

FIG. 16 shows example details of a position-to-list map table (PLMT) of FIG. 14 in accordance with some embodiments.

DETAILED DESCRIPTION

Figure 1:
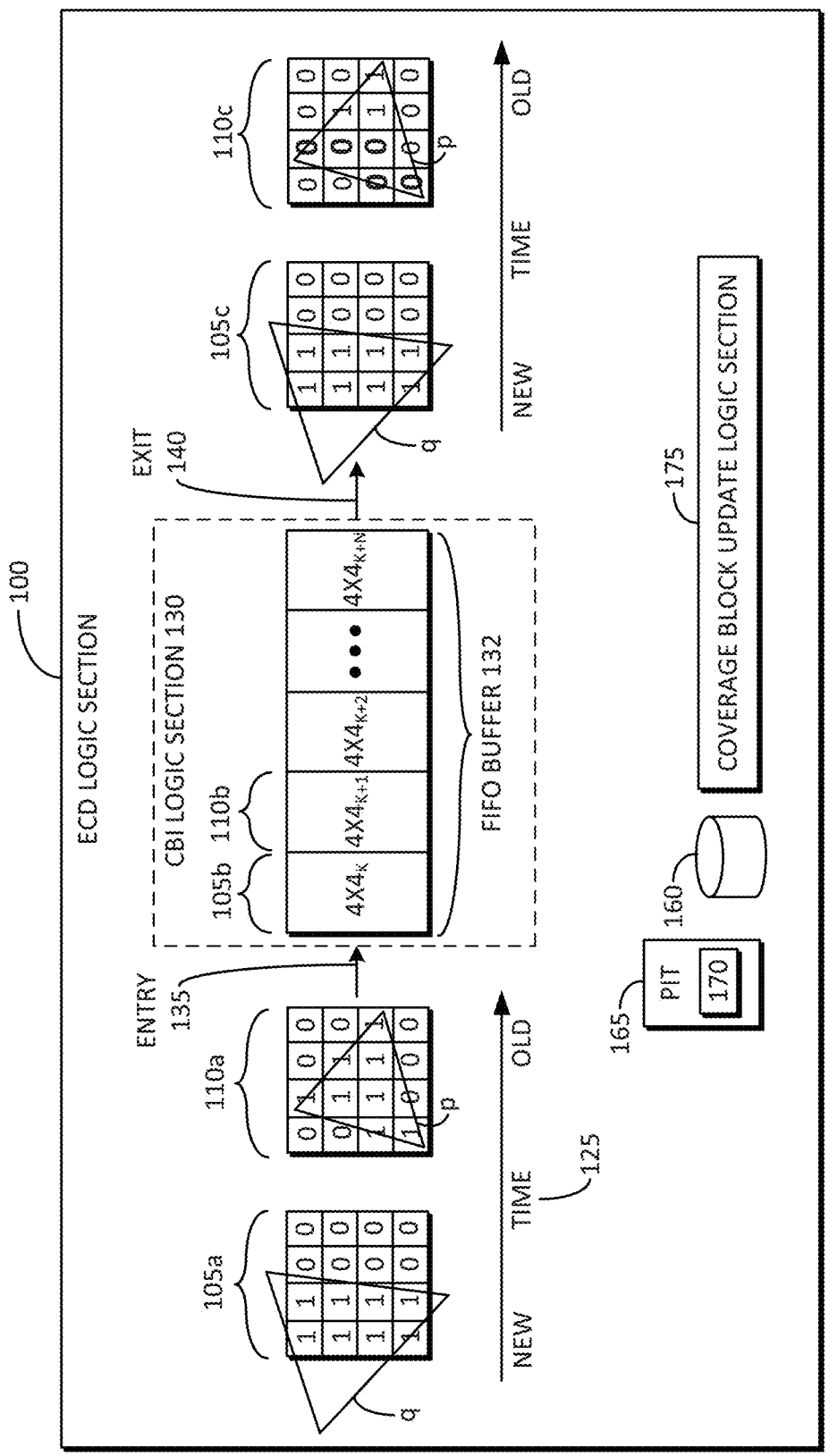
FIG. 1 is an example block diagram of an early coverage discard (ECD) logic section including a coverage block information (CBI) logic section having a first-in-first-out (FIFO) buffer in accordance with some embodiments.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first table could be termed a second table, and, similarly, a second table could be termed a first table, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments disclosed herein include an early coverage discard (ECD) technique, which is executed in a graphics pipeline after rasterization. Instead of utilizing a separate pass, quads are removed during a GPU color pass. A quad is a 2×2 group of adjacent pixels. 2×2s are common in the art (due to level-of-detail calculations used in texture mapping). As such, 2×2s and groups of 2×2s (such as a 4×4s) are referred to herein for the sake of illustration and efficiency. The disclosed technique is applied to a set of primitives within a coverage window after a depth test. The disclosed technique provides additional hidden surface removal after the depth test that achieves reduction in pixel shader quads, and therefore a reduction in computation. Embodiments disclosed herein handle depth complexity, and for most circumstances (e.g., not translucent, etc.) only the closest primitive's pixel is ultimately seen. Superfluous time and energy need not be spent on pixels that won't ultimately be seen. Embodiments disclosed herein remove redundant coverage without reducing throughput. That is, the insertion rate of coverage blocks into the ECD apparatus is in constant time O(1) and only latency is added. In other words, the insertion time is constant O(1), and thus only latency is added, but throughput of producing coverage information is not decreased.

Embodiments disclosed herein provide coverage map-based rasterized fragment level occlusion culling to reduce redundant fragment shading overhead in a tile-based graphics pipeline architecture. The occlusion culling is achieved by removing overlapping coverage within a temporally moving window of coverage that leads to quad (2×2) rejection before pixel shading.

FIG. 1 is an example block diagram of an early coverage discard (ECD) block 100 including a coverage block 4×4 information (CBI) logic section 130 having a first-in-first-out (FIFO) buffer 132 in accordance with some embodiments. It will be understood that even though 4×4 coverage blocks are used in this example, as explained above, any suitably sized coverage blocks may be used without departing from the inventive concepts disclosed herein. A moving window of rasterized 4×4 coverage blocks (e.g., pixel masks 105a and 110a) may be added to and held within the CBI logic section 130 to delay pixel shading. This is a form of deferred rendering. Overlapping coverage may be erased to remove complete quads. While it is possible to shade pixels multiple times, in a preferred embodiment the pixels are shaded only one time within the moving window in the CBI logic section 130.

In some embodiments, the CBI logic section 130 buffers the post depth-tested blocks of 4×4 pixels (e.g., 105a and 110a) in the FIFO buffer 132 to compare one or more pixel coverages at identical positions, and to erase one or more coverages. The ECD technique disclosed herein looks through a moving window of primitives (e.g., primitive q and p) in time order preserved in the CBI logic section 130. The CBI logic section 130 may buffer the primitives in the FIFO buffer 132 and determine a winning primitive in the CBI logic section 130 that contributes to the pixel shading.

Figure 2:
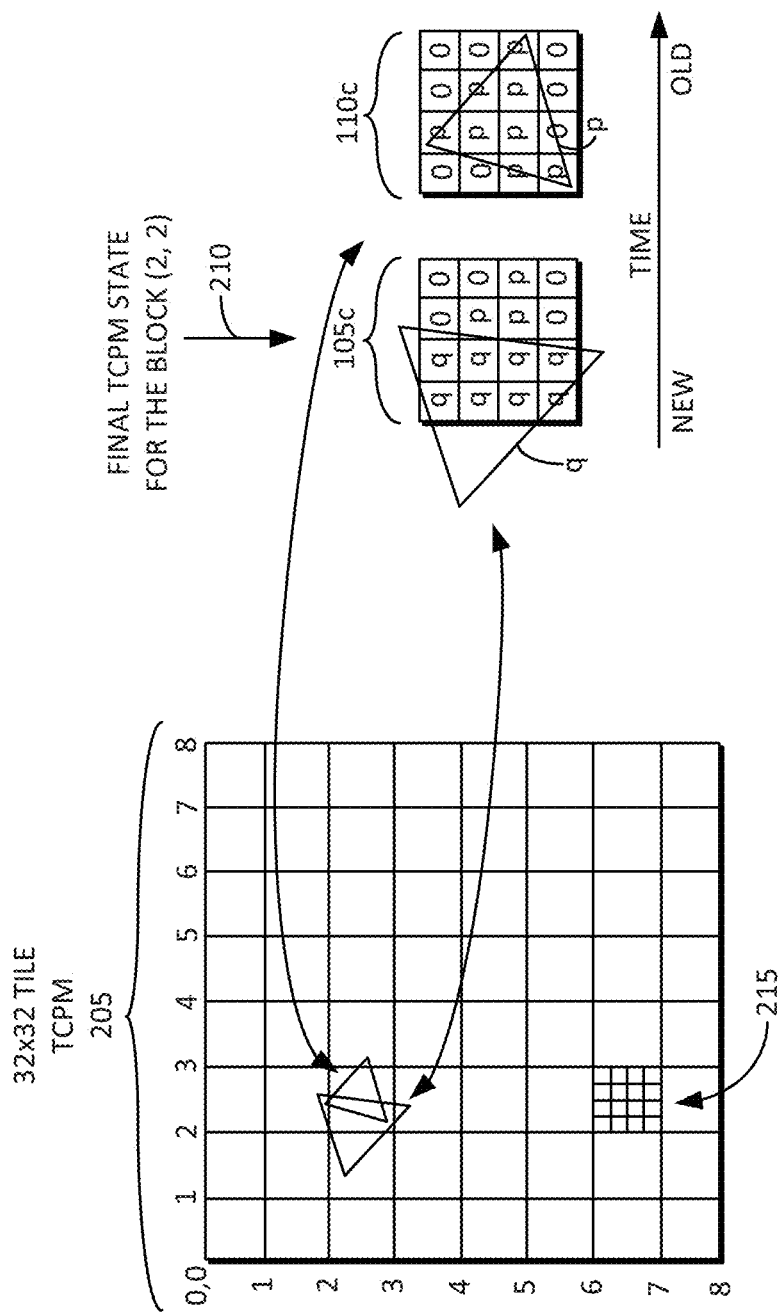
FIG. 2 is an example diagram showing a 32×32 tile coverage-to-primitive map (TCPM) in accordance with some embodiments.

FIG. 2 is an example diagram showing a 32×32 tile coverage-to-primitive map (TCPM) 205 in accordance with some embodiments. Reference is now made to FIGS. 1 and 2.

The TCPM 205 may store per pixel primitive information. On entry at 135 of each 4×4 coverage block (e.g., 105a and 110a) into the CBI logic section 130, a block update logic section 175 may update the TCPM 205. In some embodiments, the TCPM 205 includes multiple 4×4 coverage blocks such as coverage block 215. It will be understood that even though 4×4 coverage blocks are used in this example, as explained above, any suitably sized coverage blocks may be used without departing from the inventive concepts disclosed herein. Depth-compared coverages may overwrite earlier coverage without further testing. The 4×4 coverage blocks (e.g., 105a and 110a) may be inserted into the CBI logic section 130 in an order that they are generated by rasterization, and tracked within the CBI logic section 130 as buffered 4×4 coverage blocks (e.g., 105b and 110b). Rendering order may be retained at the input, but the order need not necessarily be enforced. The 4×4 coverage blocks (e.g., 105b and 110b) may eventually exit at 140 the CBI logic section 130 in FIFO order as extracted 4×4 coverage blocks (e.g., 105c and 110c). On exit at 140, the CBI logic section 130 may compare each of the extracted 4×4 coverage blocks (e.g., 105c and 110c) to the TCPM 205 for survival.

The CBI logic section 130 may receive post depth-tested 4×4 coverage blocks (e.g., 105*a* and 110*a*), which may be inserted into the CBI logic section 130 at entry point 135. As shown by the timeline 125, the older 4×4 coverage block entries are shown toward the right, while the newer entries are shown toward the left. Each 4×4 coverage block can have an associated primitive (e.g., q and p) shown as triangles in FIG. 1. On exit at 140 from the CBI logic section 130, the block update logic section 175 may check the primitive p for final block state in the TCPM 205 to update the coverage. If the primitive p is not present in some block, the block update logic section 175 can mark the pixels associated with the primitive p as 0s (e.g., shown as bold zeroes in FIG. 1). The bold 0s in the exit 4×4 coverage block 110*c* denote erased coverage. These are the pixels associated with the primitive p in the 4×4 coverage block 110*c* that are occluded by the pixels associated with the newer primitive q from the 4×4 coverage block 105*c*. The primitives q and p each have coverage in block (2, 2) in the TCPM 205. Until they left the CBI logic section 130, no other primitives touched block (2, 2) of the TCPM 205 in this example. A final TCPM state for the 4×4 coverage block 105*c* is shown at 210 in FIG. 2. As can be seen in the final state at 210, some of the pixels associated with the primitive p are occluded by some of the pixels associated with the primitive q.

Unlike distinct temporal windowed approaches, post rasterization 4×4 blocks of coverage (e.g., 105*a* and 110*a*) may be fed into the CBI logic section 130 along with their associated primitive information. The primitive information and coverage information may be saved in separate dedicated tables (as discussed in detail below). For EarlyZ and Read-Only-EarlyZ depth test modes, the coverage information provided to the ECD logic section 100 may be depth-tested against the most recent depth buffer. EarlyZ is depth processing performed prior to ECD and per-pixel shading. In other words, depth and stencil tests are executed before the pixel/fragment shaders are executed. In contrast, LateZ is depth testing performed post ECD and pixel shading, or in other words, executed after the pixel/fragment shaders are executed. When depth tests are performed before pixel shaders are executed, the pixel shaders do not modify coverage. Though live coverage data (4×4) need not be present at the ECD input with no set bits (i.e., coverage mask=16'b0), such coverages may be discarded in a post ECD EarlyZ output block. On exit at 140 from the CBI logic section 130, the 4×4 coverage blocks (e.g., 105*c* and 110*c*) may be depth tested against the latest copy of the depth buffer again. Coverage is a mask that indicates which pixels or samples in the block are covered by a primitive, and surviving coverage is remaining coverage after any coverage is erased. A coverage mask has a bit for each covered pixel or sample. Coverage masks have a '1' bit for each pixel or sample that is covered and not erased. When all live coverage is erased, the coverage mask is zero (0). When there is only one sample per pixel, then a sample is equivalent to a pixel. While it is not required that there be only one sample per pixel, the terms "sample" and "pixel" are generally used interchangeably herein.

Alternatively or in addition, on entry at 135 into the CBI logic section 130, the overlapping 4×4 coverage blocks (e.g., 105*b* and 110*b*) may be updated by the block update logic section 175. In this example embodiment, each entry in the CBI logic section 130 refers to one 4×4 coverage block in the tile (e.g., TCPM 205) and can have live coverage that belongs to only one primitive. On exit at 140 from the CBI logic section 130, if a 4×4 coverage block (e.g., 105*c* and 110*c*) has no live coverage (e.g., due to an update mechanism) then this 4×4 coverage block may be discarded and not forwarded. The ECD logic section 100 may also record the resident primitives. On exit at 140 from the CBI logic section 130, the coverage count for the primitive may be remembered in a table, referred to as a primitive information table (PIT) 165. Based on a depth of the FIFO buffer 132 of the CBI logic section 130, multiple primitives (e.g., q and p) may be resident in the PIT 165 and/or in attribute storage 160 for resident primitives. Optionally, the content of the PIT 165 can include a 4×4 live coverage count 170. For example, when a first 4×4 coverage block (e.g., 110*a*) of a primitive (e.g., primitive p) enters the CBI logic section 130, the primitive 4×4 live coverage count 170 in the PIT 165 may be incremented. For a last 4×4 coverage block of a primitive, this count value 170 may be tested. EarlyZ output may make a decision based on the count value 170.

The TCPM 205 may remember which primitive in the PIT 165 last wrote to a pixel. On exit at 140 from the CBI logic section 130, the 4×4 coverage block entry (e.g., 105*c* and 110*c*) ensures no pixel has live coverage if its PIT primitive index does not match at least one primitive index stored in the TCPM 205. While the TCPM 205 in FIG. 2 shows a 32×32 tile size, it will be understood that other sizes may be used (e.g., tiles ranging from 4×4 tiles to 512×512 tiles). Each tile can include a 4×4 coverage block. Each TCPM may utilize a suitable amount of storage (e.g., 2 KB to 16 KB), and suitability may depend on the number of bits required to identify an entry in the PIT 165. To prevent long stalls between tile passes, or when overlap between draw calls cannot be allowed, the TCPM 205 may be double-buffered, or even multi-buffered with more than two buffers. Each time a new primitive is detected, it may be assigned a new entry in the PIT 165. An index of this entry may be used to interact with the TCPM 205. The ECD logic section 100 may interact with the TCPM 205 when it receives a new 4×4 coverage block for the CBI logic section 130. Upon storing the 4×4 coverage block in the CBI logic section 130, the block update logic section 175 may update positions within the TCPM 205 corresponding to live pixels of the particular 4×4 coverage block with the corresponding PIT index of the primitive whose rasterization generated it. Since the incoming 4×4 coverage blocks have already been depth tested prior to entry at 135 into the CBI logic section 130, only coverage that survived depth testing appears at the input to the ECD logic section 100. Rendering this coverage overwrites whatever was previously written to these locations, either in ECD or later in the rendering pipeline. The older data can be overwritten, which the ECD logic section 100 accelerates when possible. The exception to this is when translucent or true LateZ draw calls are rendered, or when other coverage related controls are changed such as when particular render target write enables are changed.

The incoming live coverage may immediately update the TCPM 205 with the PIT entry index of the primitive that generates that particular 4×4 coverage block, and may set the valid status of any pixels or samples that are covered. Any intermediate coverage for those pixels may be erased because it will be overwritten in the depth buffer and render targets when a depth buffer test fails, as long as it is not in a translucent draw call or when some coverage change disallows erasure.

On exit at 140 from the CBI logic section 130, the CBI logic section 130 may compare a 4×4 coverage block entry (e.g., 105*c* and 110*c*) index within the PIT 165 with the corresponding pixels in its 4×4 location in the TCPM 205. All the matching coverage creates its surviving 4×4 coverage. This process is called the ECD coverage survival mechanism. Primitive information from the PIT 165 may also be read out and sent to post-pixel shader storage, as further explained below.

Incoming primitive data may arrive with the first coverage block of the primitive. This incoming primitive data may be saved in the PIT 165. Empty primitives may optionally arrive, if convenient for the implementation, and may be placed into the PIT 165. The PIT 165 may also store state information related to any special event along with a corresponding entry in the CBI logic section 130. For example, a control entry may be asserted in the PIT 165. The control information may be saved in the PIT 165, and an entry in the CBI logic section 130 may have a pointer to an entry in the PIT 165. For control information, this process of mapping keeps them in order with rendering. Individual entries in the CBI logic section 130 may also include an index to their corresponding entry in the PIT 165. For example, primitive information stored in the CBI logic section 130 may include the index that ties the entries in the CBI logic section 130 to the entries in the PIT 165. Indexes may be chosen according to the elements being accessed. More entries in a CBI logic section 130, for example, can achieve more ideal detection and removal of depth complexity, but at a cost in buffer area and system latency. The order of primitive rasterization may determine coverage erasure. In addition, the length of the CBI logic section 130 and the residency time in the CBI logic section 130 may also determine the coverage erasure. The order of input and output may be maintained along with the residency timing. For example, primitives and synchronization events remain in and exit in the same order in which they arrived.

In some embodiments, all the LateZ related traffic may bypass the ECD logic section 100 as long as the FIFO buffer 132 of the CBI logic section 130 is empty. Otherwise, a flush condition would be triggered. A flush is when the full contents of the ECD logic section 100, at the time of flush, is pushed out of the ECD logic section 100 without any further coverage removal from it. For the situation of EarlyZ to LateZ transition, the FIFO buffer 132 of the CBI logic section 130 may be drained. A natural drain is where input coverage pushes out FIFO buffer entries. A forced drain is a form of natural drain or flush that the hardware may perform to prevent logic above the ECD logic section 100 from locking up the pipeline. Scenarios exist in which a transition from examining depth post-ECD to pre-ECD occurs. In these scenarios some ECD structures of the ECD logic section 100 are flushed to prevent incomplete state being used during future operations. Such flushes may be limited in their scope to maximize efficacy of the ECD logic section 100 while maintaining correct functionality. In general, state may only be changed between draw calls. From the rendering pipeline's point of view, the draw calls have constant state. A draw call is one or the other. The application will split it by changing state. Hence, a LateZ to EarlyZ switch may be on a draw call boundary.

To reduce cost, energy consumption and complexity, comparing and updating coverage on entry at 135 to the CBI logic section 130 is preferable to depth testing on exit at 140 of the CBI logic section 130. In some embodiments, coverage in the TCPM may be updated at the ECD input, but compared and extracted at the ECD output. Since the 4×4 coverage data is already depth tested, consecutive (i.e., in time order and from different primitives, though more complicated ordering can be used as long as it meets API rendering requirements) 4×4 coverage blocks having identical positions in tile should erase the previous coverage. Keeping CBI logic section 130 contents constant, once written, and using the TCPM to erase it at exit makes the ECD CBI logic section 130 FIFO update implementation easier and cheaper. An optional approach is to modify CBI logic section 130 contents. Keeping CBI logic section 130 contents unchanged enables simple pass-through of draw call data that cannot be erased for functional reasons. Without doing depth buffer access or the depth testing, the ECD 4×4 block update logic section 175 can overwrite previous coverage with the new coverage. On exit at 140, the 4×4 coverage block entry is not required to be tested for depth. The PIT 4×4 coverage count 170 may be updated. It will be understood that using the PIT coverage count is optional. One or more state fields may be used for the correct operation of the ECD logic section 100 in rasterization control flow logic. Those states may be provided by standard state propagation and update mechanisms. The ECD logic section 100 may be disabled, for example, during translucent draw calls, LateZ draw calls, and read-only EarlyZ draw calls. Mappings of primitives may be provided so that updates, i.e., insertions of new coverage blocks are in constant time rather than O(<size-of-CBI-buffer>) or O(<size-of-PIT>). State information may indicate whether operations in the ECD logic section 100 are applicable or not. For example, when primitives are translucent, they are not removed when another primitive is in front of them, otherwise it would not be possible to blend the two. Primitives and control tokens remain in temporal order.

A linked-list approach is disclosed below, which is an alternative to the TCPM-based approach. The approach using the TCPM 205 has several advantages. It is easier to implement and verify. In addition, the TCPM 205 has significantly higher performance in terms of throughput. The linked-list approach, on the other hand, uses less memory, but does use a search in greater than constant time.

Figure 3:
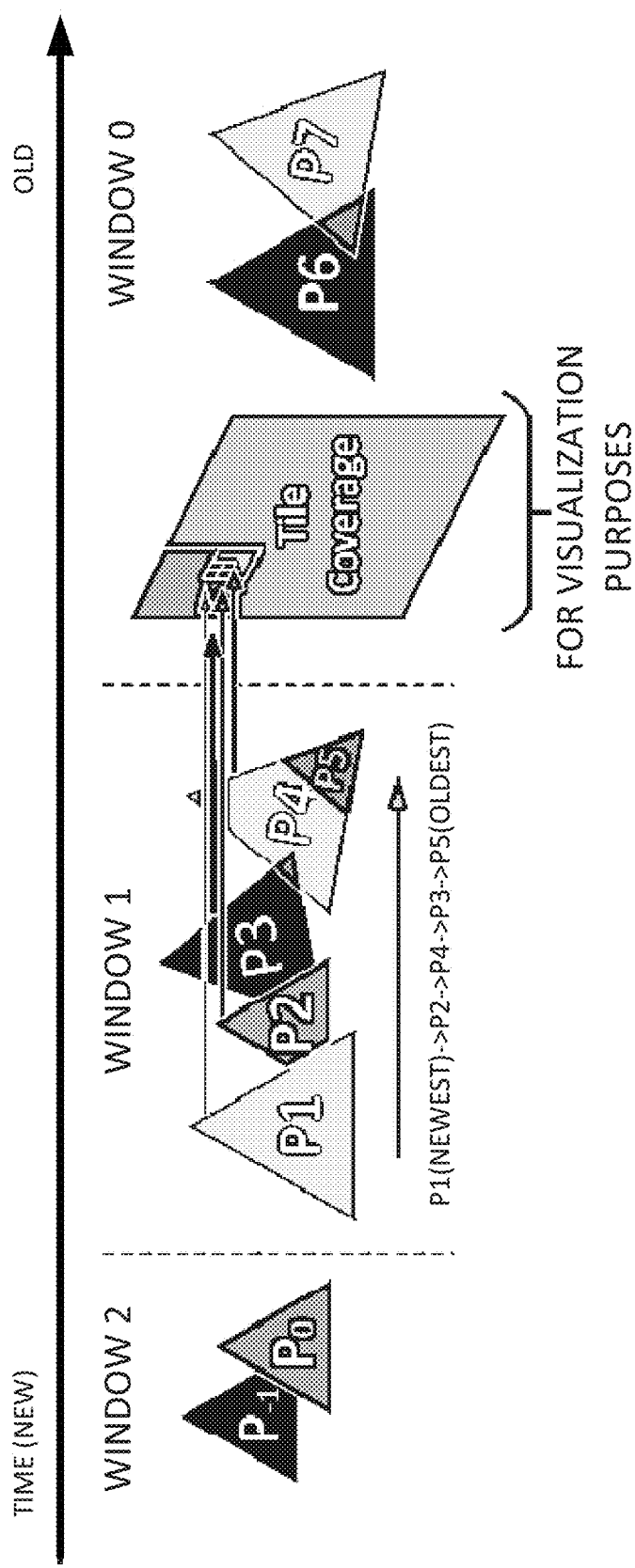
FIG. 3 is an example diagram of a block coverage technique in accordance with some embodiments.

FIG. 3 is an example diagram of a block coverage technique in accordance with some embodiments. In temporal window 1, primitive P5 is entirely occluded by primitive P4, and does not contribute to pixel shading.

The windows of primitives can be distinct or overlapping. To improve hardware efficiency and reduce the implementation complexity and localized implementation within the GPU pipeline, the ECD technique disclosed herein processes a sliding window of primitives and associated coverage.

Figure 4:
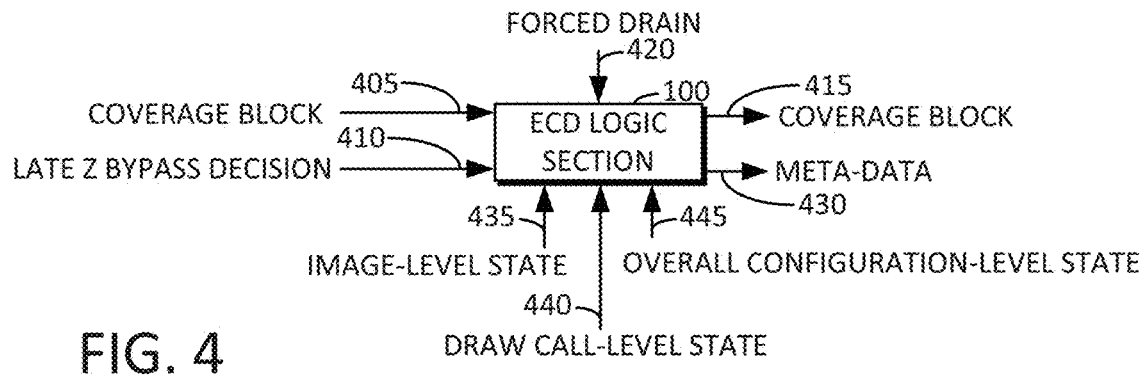
FIG. 4 is another example block diagram of the ECD logic section in accordance with some embodiments.

FIG. 4 is another example block diagram of the ECD logic section 100 in accordance with some embodiments. FIG. 4 is also applicable to the linked-list embodiment that is disclosed below. The ECD logic section 100 may receive coverage blocks at 405. It will be understood that even though 4×4 coverage blocks may be used, as explained above, any suitably sized coverage blocks may be used without departing from the inventive concepts disclosed herein. The ECD logic section 100 may receive a late Z bypass decision at 410 for cases such as most LateZ draw calls where it cannot be enabled without risking rendering errors. The ECD logic section 100 may receive a forced drain signal at 420. The ECD logic section 100 may receive image-level state, draw call-level state, and overall configuration-level state information at 435, 440, and 445, respectively. The ECD logic section 100 may send coverage blocks to the post-pixel shader storage (e.g., 525 of FIG. 5) at shown at 415. The ECD logic section 100 may send additional meta-data at 430. The additional meta-data may be associated with a primitive, which is accessible to the system downstream of the ECD logic section 100 for those primitives which have surviving coverage post-ECD. For example, the additional meta-data may be used in producing a per-pixel color or texture coordinate.

The ECD logic section 100 provides a moving coverage window-based fragment overdraw reduction. The ECD logic section 100 further provides a localized implementation of HSR. The ECD logic section 100 further provides a deterministic implementation of windowed HSR. Advantages of the ECD logic section 100 may include the ability to be restarted if translucency is introduced in the middle (in time) of a frame. The ECD logic section 100 does not erase coverage during translucent draw calls. In certain cases, the ECD logic section 100 only disallows removing coverage between draw calls with certain state transitions. For example, when a draw call writes to a certain subset of render targets, and the next writes to a different subset, the ECD logic section 100 only removes coverage within its own subset of render targets but not across the two. In some embodiments, this can be implemented by switching TCPMs between them. Multiple TCPMs may be used to allow the ECD logic section 100 to work as if it is flushing data when it has not yet done so. This allows the ECD logic section 100 to continue processing input data without waiting for down-stream logic (e.g., pipeline stages, processing stages and queues) to consume all data currently contained in the ECD logic section 100.

Though mid-frame translucency is currently not so common, it is permissible in the APIs and some graphics applications may have special reasons to require this. Based on application requirements, the ECD logic section 100 can be programmed by a driver to start draining and restart. The ECD logic section 100 can be optionally turned off by the driver if only several large screen/tile covering primitives appear in an image. To hide latency of the situation when the depth and/or coverage is determined by the shader (e.g., shader-modified-depth/discard), the ECD logic section 100 can also work if multiple parallel tile rendering is supported with minor architectural modifications. The ECD logic section 100 may function as if two different tiles are working on two different GPU pipelines or pipeline states in the rasterizer, as well as throughout the rendering pipeline. While one GPU pipeline is waiting on the post-shader information to become available, the other GPU pipeline can pixel shade the quads generated by the ECD logic section 100 working on the TCPM 205. LateZ to EarlyZ (e.g., depth/coverage is determined pre-pixel-shader execution) transition latency tolerance can be effectively implemented using the ECD logic section 100. In some embodiments, quad merge may be implemented in the ECD logic section 100 using the same storage and some common logic.

Figure 5:
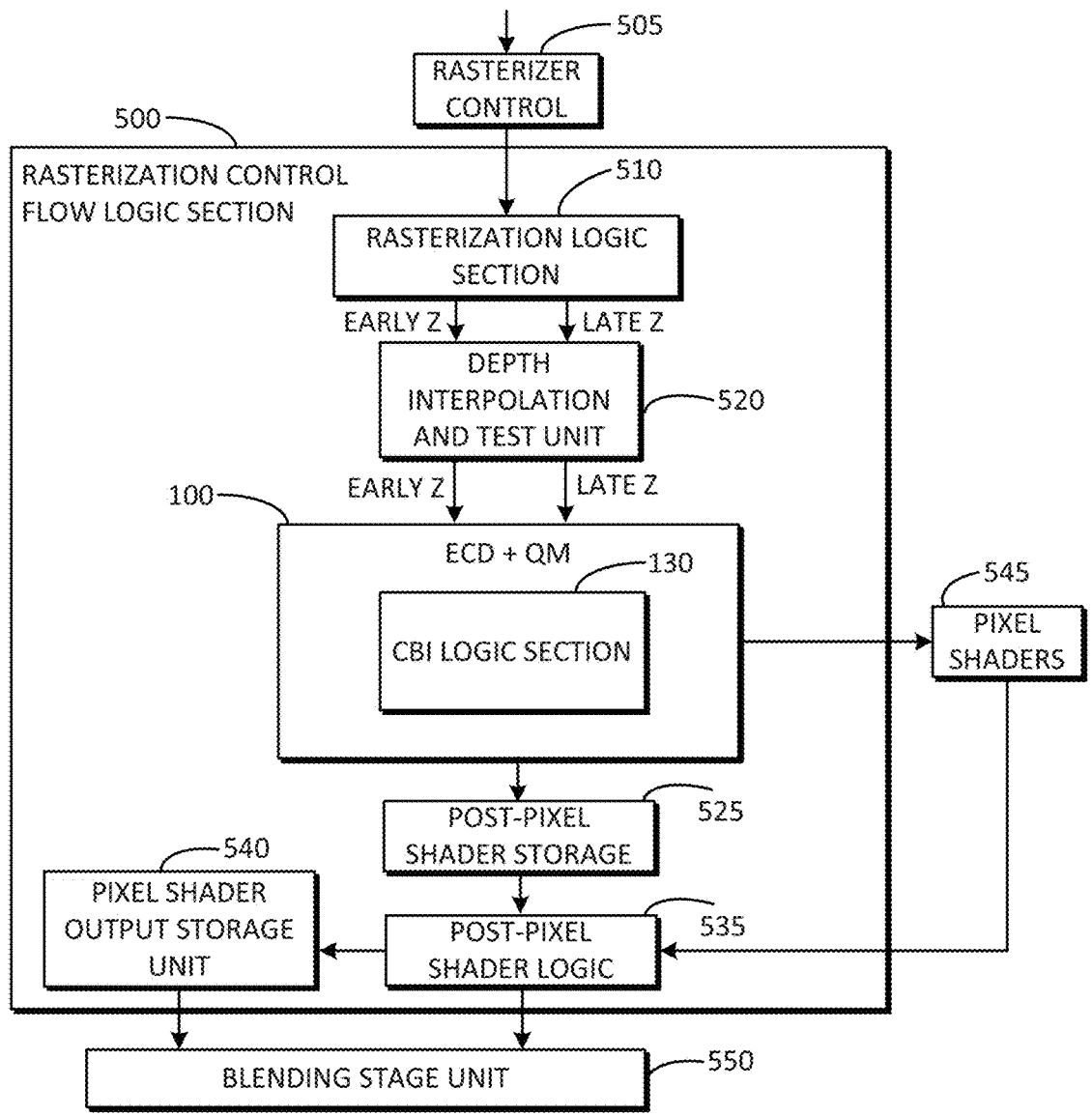
FIG. 5 is an example block and flow diagram of the ECD logic section within rasterization control flow logic in a GPU in accordance with some embodiments.

FIG. 5 is an example block and flow diagram of the ECD logic section 100 within rasterization control flow logic section 500 in a GPU in accordance with some embodiments. The rasterization control flow logic section 500 may include rasterization logic, depth/stencil testing logic, and back-end graphics pipeline data and control flow logic. As shown in FIG. 5, the ECD logic section 100 is disposed inside the rasterization control flow logic section 500 in a GPU pipeline. A depth interpolation and test unit 520 may perform the depth tests, and may remove coverage from blocks of pixels generated by rasterization, which are the coverage input to ECD logic section 100. The coverage blocks may be fed into the ECD coverage (e.g., CBI logic section 130) in a FIFO manner. The depth of the FIFO buffer 132 of the CBI logic section 130 may support the deferred operation of the coverage block transmission to pixel shaders and the post-pixel shader storage 525 (i.e., consumer of the ECD coverage blocks).

The rasterizer control unit 505 may be coupled to the rasterization control flow logic section 500. The rasterizer control unit 505 may perform setup computations for rasterization and attribute plane equation generation, storage and management. The rasterization control flow logic section 500 may include a rasterization logic section 510, the depth interpolation and test unit 520, the ECD logic section 100, the post-pixel shader storage 525 (which may include storage and related logic for information required after the pixel shaders are executed), and a post-pixel shader logic section 535. The post-pixel shader logic section 535 may be coupled to a pixel shader output storage unit 540. The ECD logic section 100 may be coupled to a pixel shaders logic section 545. The pixel shader storage unit 540 and the post-pixel shader logic 535 may be coupled to a blending stage unit 550.

The depth interpolation and test unit 520 may send post Z test 4×4s to the ECD logic section 100. The CBI logic section 130 may buffer the quads in a FIFO manner in the FIFO buffer 132. Once the FIFO buffer 132 is filled, a draining procedure may be started for the quads. The ECD logic section 100 may share hardware with or otherwise include quad merge (QM). Driver level on/off control may be made available for the block on draw-call boundaries. An existing pre-pixel shader logic in the rasterization control flow logic section 500 may have minor interface changes made to operate with the disclosed embodiments, however, a new interface is not required.

Figure 6:
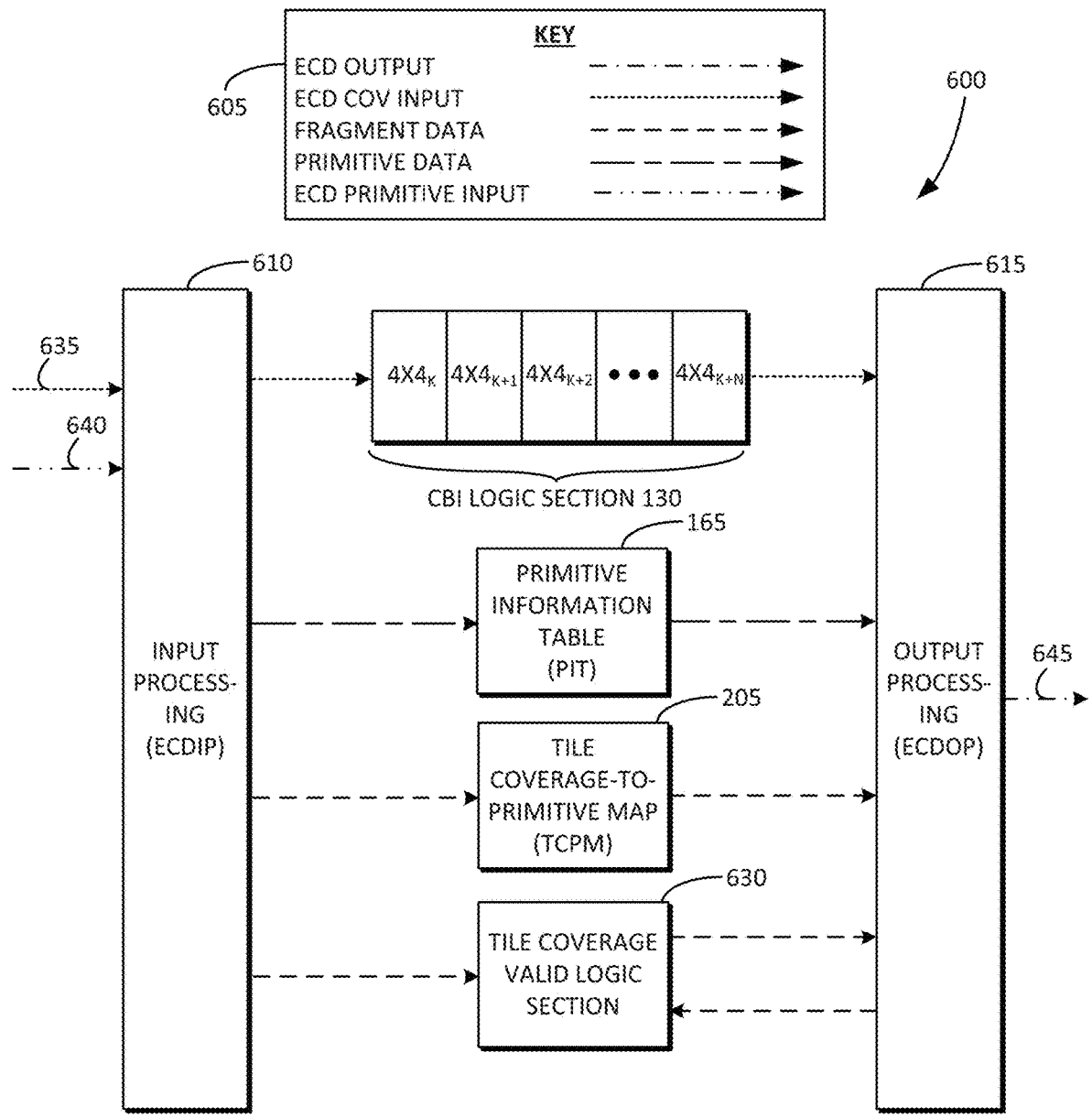
FIG. 6 is an example block and flow diagram of TCPM ECD implementation logic in a GPU in accordance with some embodiments.

FIG. 6 is an example block and flow diagram 600 of TCPM ECD implementation logic in a GPU in accordance with some embodiments. The diagram 600 includes a key 605 that shows various kinds of dashed lines representing an ECD output, an ECD overage input, fragment data, primitive data, and an ECD primitive input. Incoming coverage blocks 635 from pre-pixel shader logic (i.e., graphics pipeline logic after rasterization but before pixel shaders) are received at the input processing stage 610 and stored in the CBI logic section 130. It will be understood that even though 4×4 coverage blocks are used in this example, as explained above, any suitably sized coverage blocks may be used without departing from the inventive concepts disclosed herein. This information may further be provided to an ECD output processing stage 615. The TCPM 205 may hold tiles of various sizes. For example, the TCPM 205 may hold n×n elements in an array, where n is a positive integer (e.g., $4 \leq n \leq 512$), depending on the characteristics of the GPU. The array may be indexed using the pixel position within the tile (X, Y). Each entry in the array may be a 7 bit (e.g., for a 128 entry FIFO) PIT 165 entry index, plus 1 bit for the primitive face if quad merge is included. Along with that, each TCPM may also have a table for remembering the validity of a pixel in the ECD logic section 100.

The input processing stage 610 may receive the 4×4 coverage blocks at 635 and ECD primitive input at 640. The CBI logic section 130 may buffer the 4×4 coverage blocks in FIFO order in the FIFO buffer 132 and provide them to the output processing stage 615. The PIT 165 may receive primitive data from the input processing stage 610 and may send primitive data to the output processing stage 615. The input processing stage 610 may write fragment coverage data to the TCPM 205. The output processing stage 615 may read the fragment coverage data from the TCPM 205. The tile coverage valid logic section 630 may receive fragment data from the input pipeline, and may send and receive fragment data to and from the output processing stage 615. The output processing stage 615 may send 4×4 coverage blocks and associated primitives to the pre-pixel shader logic of the rasterization control flow logic (e.g., 500 of FIG. 5) as shown at 645.

FIG. 7 is an example primitive information table (PIT) 700 in accordance with some embodiments. FIG. 8 is an example TCPM valid table (TVT) 800 in accordance with some embodiments. FIG. 9 is an example TCPM table 900 in accordance with some embodiments. FIG. 10 includes example details of contents 1000 of an example coverage block information (CBI) logic section table in accordance with some embodiments. It will be understood that some or all of the contents shown in each table may be included in each table.

Reference is now made to FIGS. 7 through 10.

In some embodiments, different stages of the pipeline may be simultaneously working on different draw calls and/or tiles. Data in some of the various tables may be packed by quads. The quads may be packed into 4×4 blocks of pixels. It will be understood that even though 4×4 coverage blocks are used in this example, as explained above, any suitably sized coverage blocks may be used without departing from the inventive concepts disclosed herein. In general, all of the data for the coverage blocks may be accessed together. Incoming coverage blocks of pixels may be indexed using the tile position (X, Y) of the block. The primitive information may be saved in the primitive information table (PIT) 700 of FIG. 7, which may be indexed by an index value. Each index of the PIT 700 may have associated therewith PIT fields (e.g., Az, Bz, Cz) and metadata. Output of the pre-pixel shader logic may have primitive information, which may be saved in the PIT to avoid replication across all the touching coverage blocks. The PIT may be augmented with the surviving coverage count to simplify primitive and primitive attribute management.

There is no limitation on the depth of the FIFO buffer 132 of the CBI logic section 130. The deeper the FIFO buffer 132, the longer into the past the system can look into and reduce the pixel shading. For a deeper FIFO buffer 132, resident primitive count also increases and additional attribute storage 160 is used.

Figure 11:
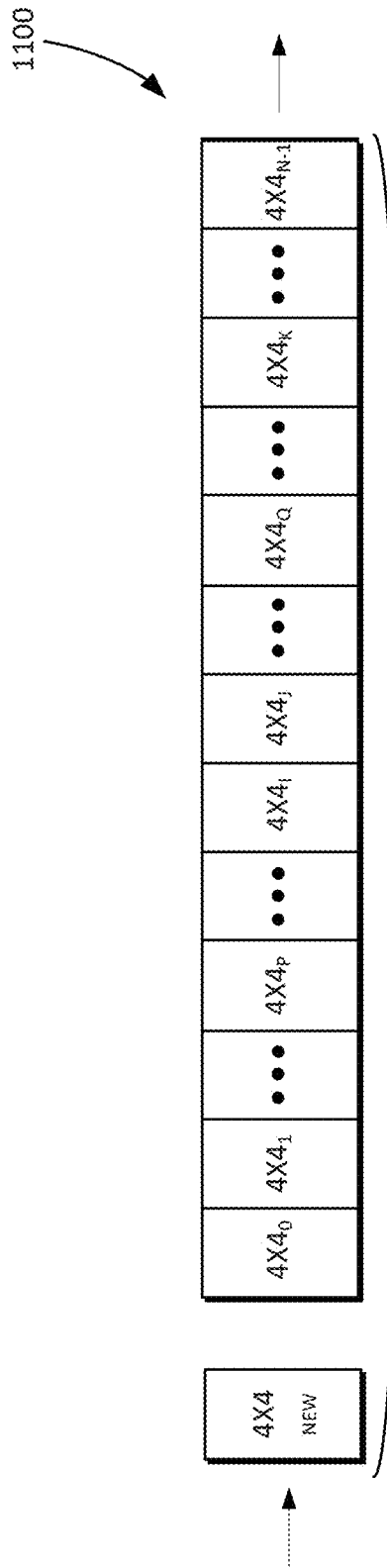
FIG. 11 is an example table demonstrating a CBI logic section update process before update in accordance with some embodiments.
Figure 12:
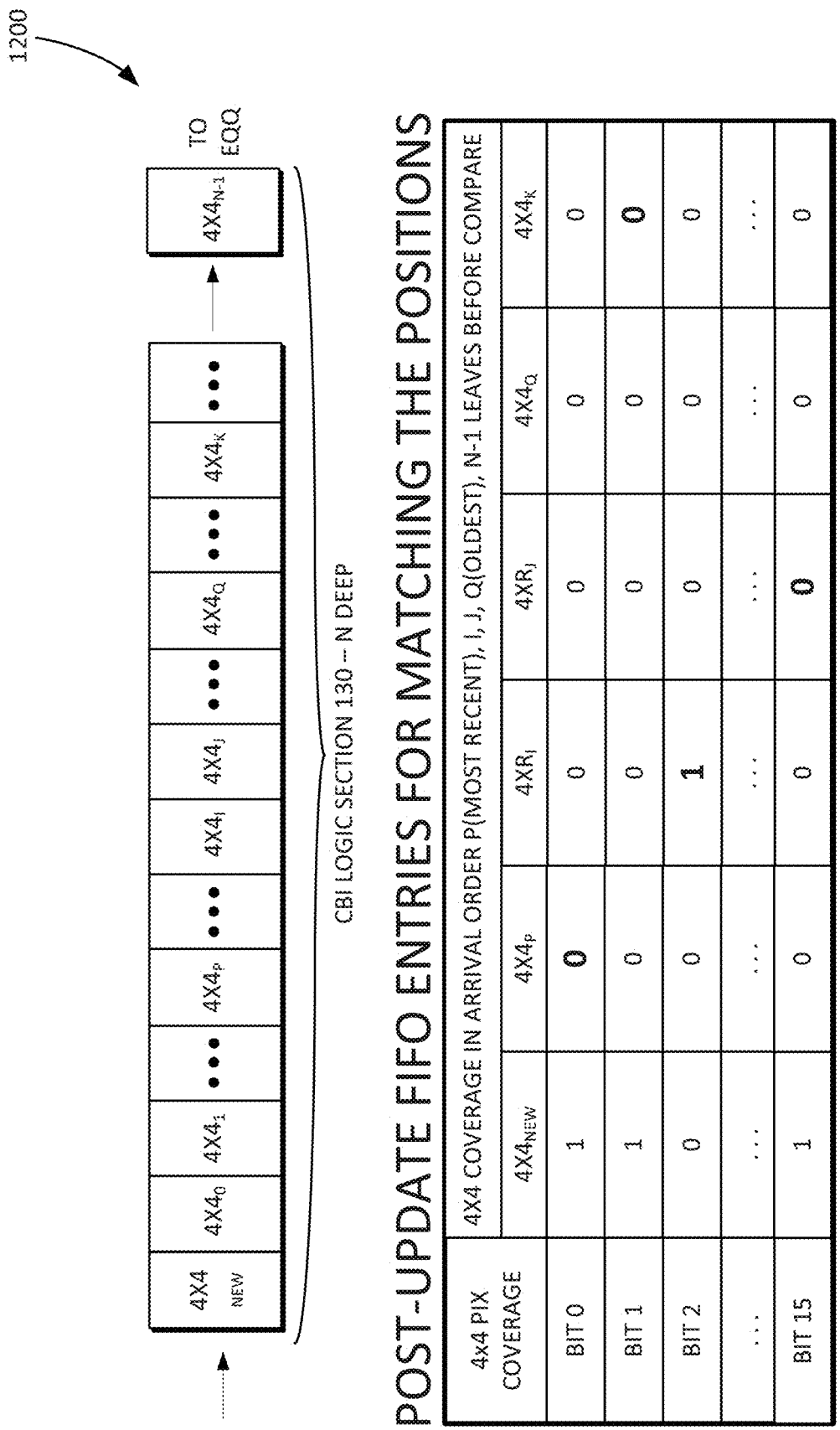
FIG. 12 is an example table demonstrating the CBI logic section update process after update in accordance with some embodiments.

FIG. 11 is an example table demonstrating a CBI logic section 130 update process before update in accordance with some embodiments. FIG. 12 is an example table demonstrating the CBI logic section 130 update process after update in accordance with some embodiments. Reference is now made to FIGS. 11 and 12.

FIGS. 11 and 12 show a block update procedure without doing any depth compare. The table 1100 shows pre-update FIFO entries for matching the positions. The table 1200 shows post-update FIFO entries for matching the positions. In some embodiments, the depth of the CBI FIFO buffer 132 may be n. Entries $4 \times 4_p$, $4 \times 4_i$, $4 \times 4j$, $4 \times 4_q$ and $4 \times 4_k$ may touch the same position (X, Y) within the tile. It will be understood that even though 4×4 coverage blocks are used in this example, as explained above, any suitably sized coverage blocks may be used without departing from the inventive concepts disclosed herein. The corresponding entry in the PLMT for $CBI_{HEAD}$ and $CBI_{TAIL}$ may be p and k respectively. During an ECD update epoch (e.g., it might take multiple cycles), exiting coverage block entries from the FIFO buffer 132 might modify the list. A new entry may update the head and an exiting entry may update the tail. However, the search for update makes forward progress in each cycle within the epoch. A tail may or may not get updated during the epoch. A 4×4 new entry in the above example may reset 4×4p for bit-0. For bit-2 entry $4 \times 4_i$ may remain unchanged. For bit-15, entry 4×4j may get modified.

When the CBI logic section 130 is full or forced to drain, one entry from the exit of the FIFO buffer 132 may be released. Based on the occupancy of the quads (2×2) within the block 4×4 PIT, the entry 4×4 coverage count (e.g., 170 of FIG. 1) is updated for the matching primitive. Then the PIT entry may be reset. As an optimization, after detecting a first non-zero 4×4 coverage exit, a flag can be set. The EarlyZ output module may discard coverage blocks with no live coverage.

Figure 13:
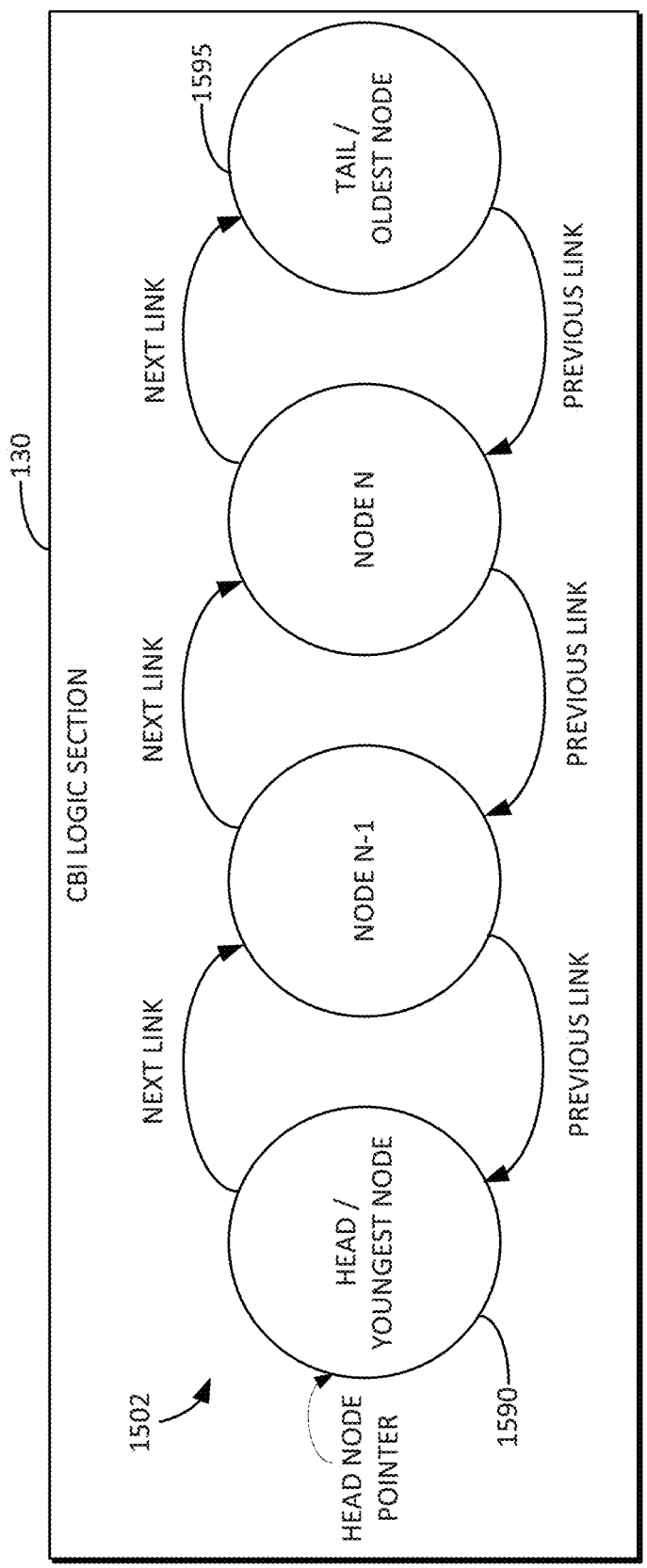
FIG. 13 is an example block diagram of the CBI logic section including a doubly linked-list.
Figure 14:
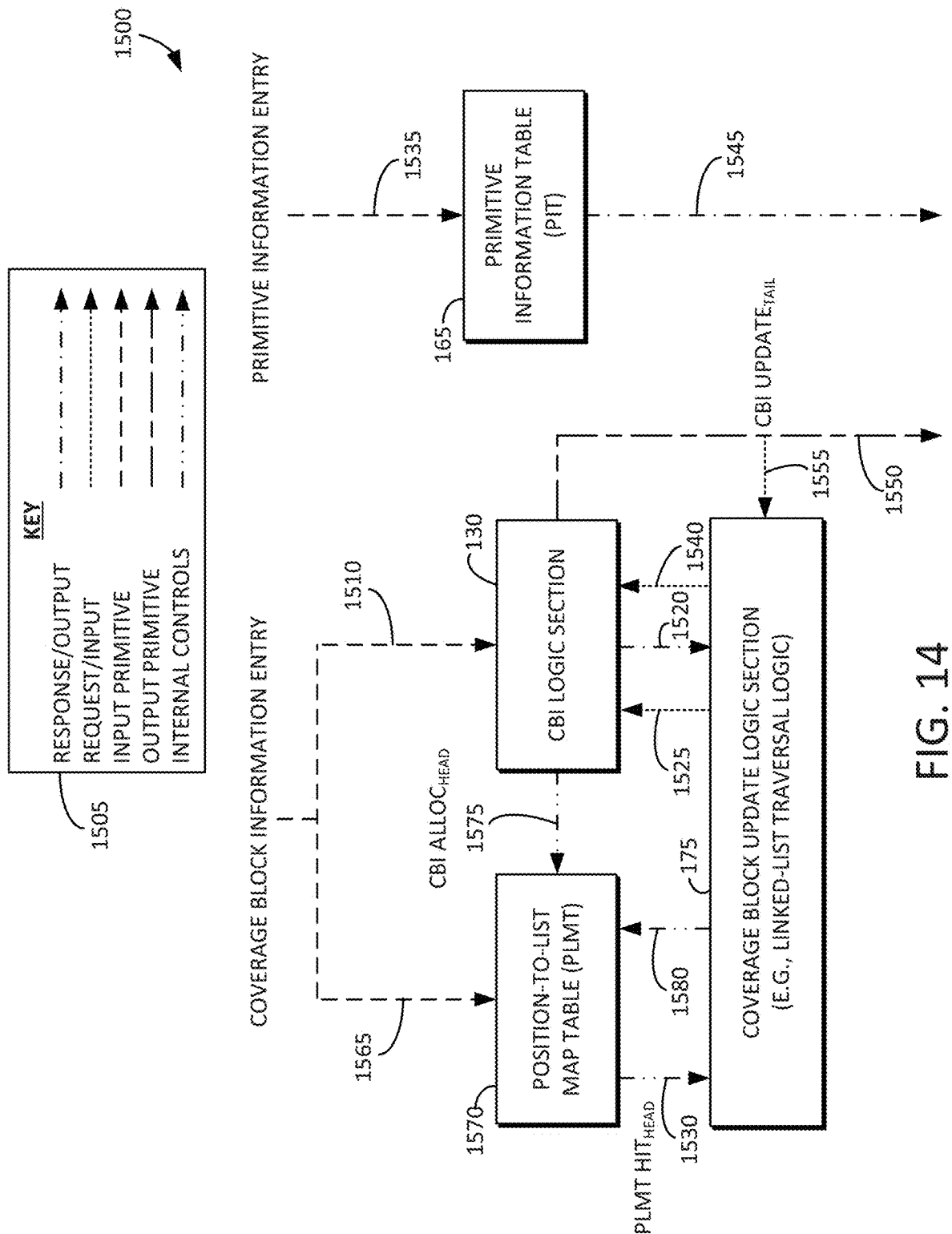
FIG. 14 an example block and flow diagram of the ECD logic section in accordance with some embodiments.
Figure 17:
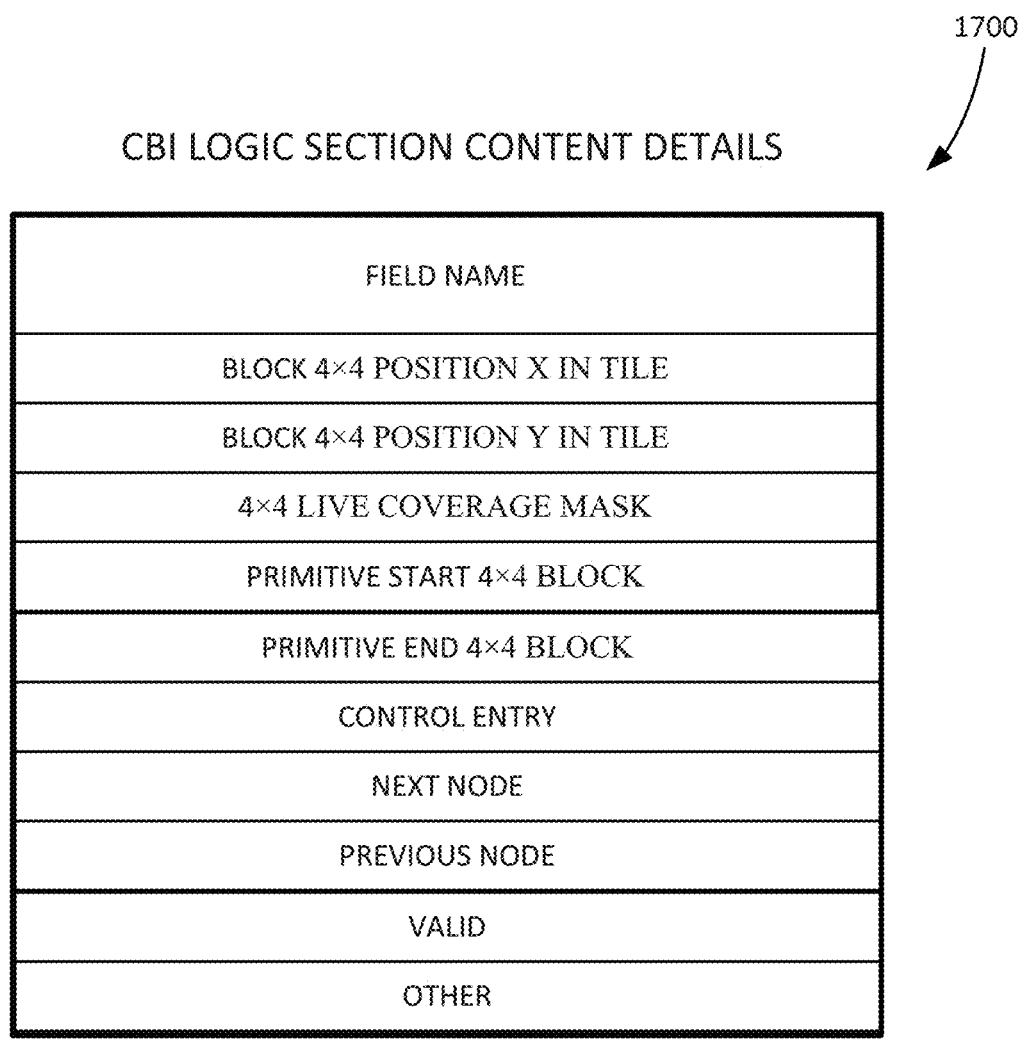
FIG. 17 includes details of contents of an example block 4×4 CBI logic section table in accordance with some embodiments.

FIG. 13 is an example block diagram of the CBI logic section 130 including a doubly linked-list 1502. FIG. 14 is an example block and flow diagram 1500 of the ECD logic section 100 in accordance with some embodiments. FIG. 15 shows example details 1605 of the linked-list 1502 of FIG. 13 in accordance with some embodiments. FIG. 16 shows example details of the PLMT 1570 of FIG. 14 in accordance with some embodiments. FIG. 17 includes example details of contents 1700 of an example CBI logic section 130 in accordance with some embodiments. Reference is now made to FIGS. 13, 14, 15, 16, and 17.

Instead of using a content addressable memory (CAM) based search technique, a linked-list or table can be used to allow for accessing entries in a random access memory (RAM) providing the behavior of a CAM. It will be understood that other data structure implementations may be used besides a map or a linked-list without departing from the inventive concepts disclosed herein. A position-to-list map table (PLMT) 1570 (of FIG. 14) may include the head of a doubly linked-list 1502 (of FIG. 13) of the primitives containing coverage within the specific coverage block of the tile. The end of the linked-list 1502 may be determined by a tail pointer 1595, and the beginning of the linked-list 1502 may be determined by a head pointer 1590. If the next node of the CBI logic section content details shown in FIG. 17 is equal to the entry ID of the current node, then the current node is the last node in the list, and thus represents the tail. For a given position (X, Y) within the tile, a list of primitives touching the coverage block may be arranged as the doubly linked-list 1502. The doubly linked-list 1502 may be a time-ordered set of coverage blocks, though more complicated ordering, such as reordering while maintaining order for each position, can be implemented as long as API rendering requirements are met.

In some embodiments, the CBI logic section 130 may include the doubly linked-list 1502. The PIT 165, on the other hand, acts as a FIFO buffer. Coverage blocks to the same position in a particular tile are chained through a linked-list. The linked-list is doubly linked, and provides the next and previous node pointers, as shown in FIG. 13. The linked-list pointer information is stored in the CBI logic section 130 per coverage block. Thus, every coverage block entry in the linked-list 1502 is able to identify an immediate youngest member and an immediate oldest member in the chain. 1590 is the youngest member in the chain. 1595 is the oldest member in the chain. From the perspective of a specific node (or entry), the immediate youngest is the previous node and the immediate oldest is the next node-thus, the previous node is not necessarily the youngest member 1590 in the chain, and the next node is not necessarily the oldest member 1595 in the chain. The PLMT 1570 maintains a mapping between the position of the coverage block on a particular tile and the head node 1590 in the linked-list 1502. The index is a function of the X and Y position of the coverage block on the tile. Each entry indicates whether a coverage block to the X and Y position exists in the ECD logic section 100, and when it exists, it provides the linked-list head-node pointer. This can be used to retrieve the youngest node 1590 in the linked-list 1502.

Coverage blocks enter the ECD logic section 100 and update the PLMT 1570, the CBI logic section 130, and the PIT 165. The coverage block is allocated an entry in the linked-list 1502 of the CBI logic section 130. This coverage block is the youngest, and the location in the linked-list 1502 is the head-node pointer (i.e., CBI ALLOC$_{HEAD}$ 1575 in FIG. 14). On entry into the ECD logic section 100, when the coverage block does not exist in the ECD logic section 100, meaning that a look-up operation to the position in the PLMT 1570 missed (i.e., invalid entry in the PLMT 1570), then the PLMT entry is marked as valid, and the CBI ALLOC$_{HEAD}$ (of FIG. 14) is stored as the linked-list head 1590 (of FIG. 13).

Otherwise, on entry into the ECD logic section 100, when the coverage block exists in the ECD logic section 100, meaning that a look-up operation to the position in the PLMT 1570 hit (i.e., valid entry in the PLMT 1570), then the CBI ALLOC$_{HEAD}$ (of FIG. 14) is updated as the linked-list head in the PLMT 1570. Also, the PLMT HIT$_{HEAD}$ (of FIG. 14) is provided to the coverage block update logic section 175 to traverse the linked-list 1502.

On entry into the ECD logic section 100, the coverage block update logic section 175 may perform repeated coverage block reads (e.g., 1525 of FIG. 14) to fetch all nodes in the linked-list 1502. The coverage block update logic section 175 may also perform the coverage update operation (e.g., 1540 of FIG. 14). During the coverage update operation, the coverage block entering the ECD may erase coverage belonging to the older coverage blocks in the linked list chain. This mechanism removes coverage that is hidden or occluded.

On exit from the ECD logic section 100, the coverage block information exits the ECD logic section 100 as shown at 1550 of FIG. 14, and the primitive information exits the ECD logic section 100 as shown at 1545 of FIG. 14. The coverage block update logic section 175 fetches the previous-node in the linked-list 1502, and marks it as the tail node 1595 (of FIG. 13). When a previous node does not exist, then the PLMT entry for the exiting coverage block is invalidated to indicate that a linked-list to the specific location does not exist.

The diagram 1500 of FIG. 14 includes a key 1505 that shows various kinds of dashed lines representing a response/output, a request/input, a block input, a block output, and primitive info. The CBI logic section 130 and the PLMT 1570 may receive coverage block information input as shown at 1510 and 1565, respectively. The coverage block input may be a coverage block and associated information. The PIT 165 may receive primitive information from the block input as shown at 1535. The PIT 165 may send the primitive information as shown at 1545. The coverage block update logic section 175 may send a coverage block read request to the CBI logic section 130 as shown at 1525. The CBI logic section 130 may send a coverage block return to the coverage block update logic section 175 as shown at 1520. The coverage block update logic section 175 may send a coverage block update to the CBI logic section 130 as shown at 1540. The CBI logic section 130 may send a CBI UPDATE$_{TAIL}$ to the coverage block update logic section 175 as shown at 1555.

The PLMT 1570 may receive and store one or more coverage blocks at a particular location (e.g., X, Y) as shown at 1565. The PLMT 1570 may provide a PLMT HIT$_{HEAD}$ value to the coverage block update logic section 175 as shown at 1530. The coverage block update logic section 175 may send a PLMT invalidate signal to the PLMT 1570 as shown at 1580. The CBI logic section 130 may output a coverage block as shown at 1550.

When a new coverage block enters the ECD, the linked-list head may be updated and the PLMT entry of CBI ALLOC$_{HEAD}$ for a corresponding block may also be updated as shown at 1575. The incoming coverage block position may be used to index the PLMT 1570, and a corresponding valid bit may be checked to confirm that there is a valid list already in existence. When there is not a valid list, then the valid bit may be set and the head pointer may be updated with the index of the coverage block in the linked-list 1502 of the CBI logic section 130. When the valid bit is already set, the new coverage block may be appended to the beginning on the list and only the head pointer may be updated. The block indexed by the previous head may be fetched and the previous pointer may be updated with the new coverage block's CBI linked-list index. The previous linked-list head and tail may be forwarded to the coverage block update logic section 175 (e.g., FIG. 14).

Upon receiving the PLMT HIT$_{HEAD}$ from the PLMT 1570, the coverage block update logic section 175 may search through the linked-list 1502 until it reaches the end of the list 1502, which may be demarcated by the tail pointer 1595. Each bit in the mask may represent a sample/pixel coverage (e.g., 1: covered, 0: uncovered). For any bit position in the mask, there is only one or no set bit across all the entries in the linked-list of the coverage block entries. Newer set bits from a different primitive touching the same sample/pixel may reset the previous set bit.

Figure 18:
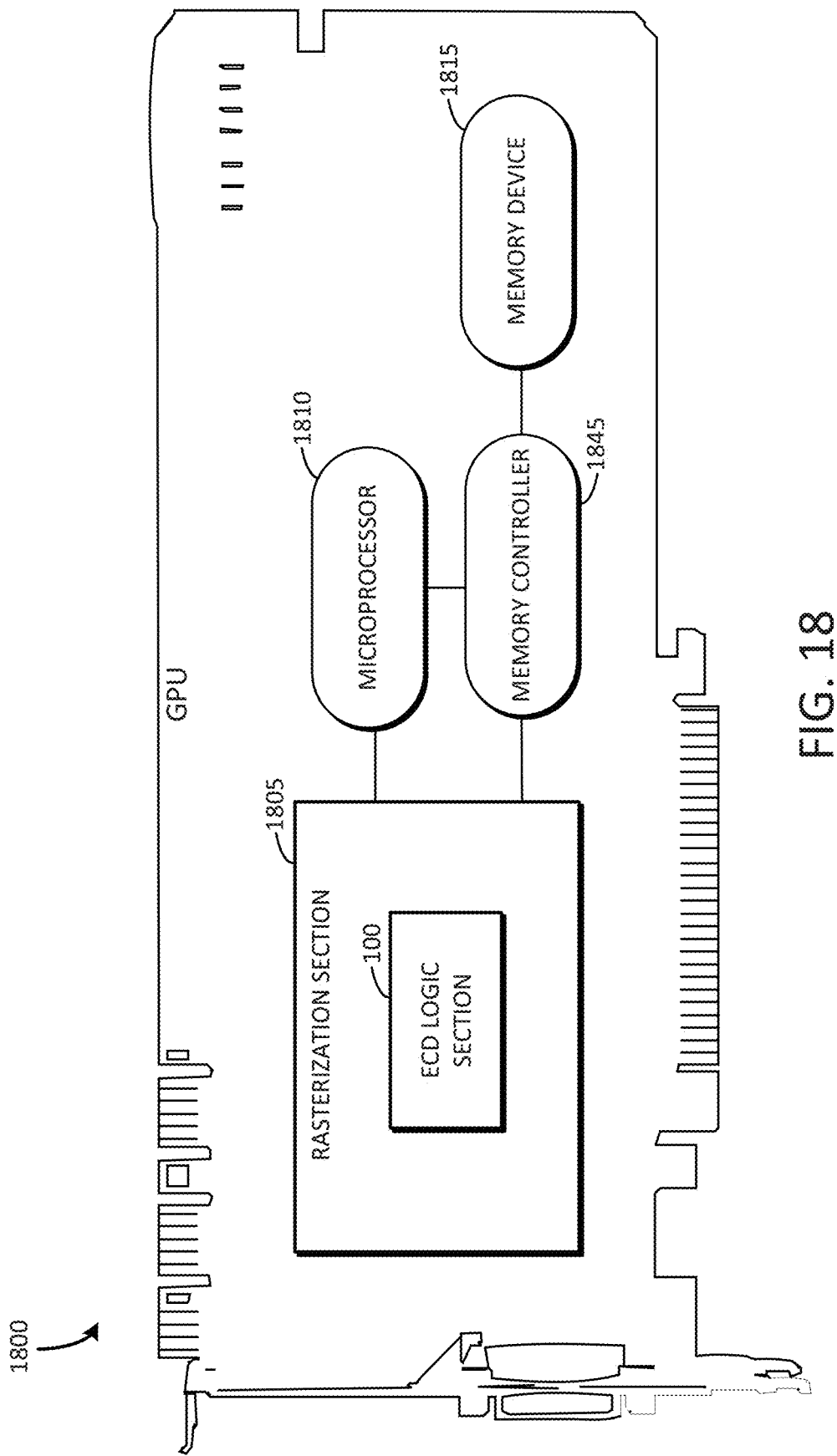
FIG. 18 is an example block diagram of a GPU including the ECD logic section of FIG. 1 according to some embodiments.

FIG. 18 is an example block diagram of a GPU 1800 including a rasterization section 1805 having an ECD logic section 100 according to embodiments of the inventive concept as disclosed herein. The GPU 1800 may include one or more microprocessors 1810, a memory device 1815 such as a RAM and/or flash memory, and a memory controller 1845. The memory controller 1845 and the memory device 1815 may constitute a solid state drive/disk (SSD), which uses a nonvolatile memory to store data.

The various operations of methods described above may be performed by any suitable means capable of performing the operations, such as various hardware and/or software component(s), circuits, and/or module(s).

Embodiments disclosed herein work equally well with multi-sample rendering (commonly called MSAA), as well as with super-sample rendering. These merely redefine coverage to represent samples within pixels instead of whole pixels. ECD operation is unchanged when these techniques are in use except for the mapping of coverage information to pixels and samples.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A computer-implemented redundant-coverage discard method for reducing sample shader work in a tile-based graphics rendering pipeline, the method comprising:
    disposing a coverage block information (CBI) logic section having a first-in-first-out (FIFO) buffer within an early coverage discard (ECD) logic section;
    receiving, by the FIFO buffer, a plurality of coverage blocks;
    buffering, by the FIFO buffer, the plurality of coverage blocks in FIFO order;
    matching, by the CBI logic section, the FIFO buffer for all coverage blocks from among the plurality of coverage blocks to a corresponding block position within a tile coverage-to-primitive map (TCPM);
    updating, by a block update logic section, at least one coverage block from among the plurality of coverage blocks that match the block position within the TCPM;
    storing, by the TCPM, per-sample primitive coverage information; and
    shading at least one sample dependent on the per-sample primitive coverage information.

2. The computer-implemented method of claim 1, further comprising:
    buffering, by the FIFO buffer, a moving window of the plurality of coverage blocks;
    comparing incoming coverage information associated with the plurality of coverage blocks with the per-sample primitive coverage information stored in the TCPM; and
    rejecting preceding overlapping coverage within the moving window of the plurality of coverage blocks.

3. The computer-implemented method of claim 1, wherein receiving includes receiving the plurality of coverage blocks from a depth interpolation and test unit of a rasterization control flow logic section of a graphics processing unit (GPU).

4. The computer-implemented method of claim 1, wherein:
    receiving the plurality of coverage blocks by the FIFO buffer occurs after depth testing has been completed; and
    buffering the plurality of coverage blocks in the FIFO buffer occurs after the depth testing has been completed.

5. The computer-implemented method of claim 1, further comprising not shading at least one sample.

6. The computer-implemented method of claim 1, further comprising shading at least one sample in surviving coverage from among the plurality of coverage blocks.

7. The computer-implemented method of claim 1, further comprising providing, by the ECD logic section, a moving coverage window-based fragment overdraw reduction across the plurality of coverage blocks.

8. The computer-implemented method of claim 7, further comprising providing, by the ECD logic section, the moving coverage window-based fragment overdraw reduction across three or more of the plurality of coverage blocks.

9. The computer-implemented method of claim 1, wherein matching further comprises matching, by the CBI logic section, the FIFO buffer for all coverage blocks from among the plurality of coverage blocks that match a block position (X, Y) within the TCPM.

10. The computer-implemented method of claim 1, further comprising updating a primitive information table (PIT) when each of the plurality of coverage blocks exits the FIFO buffer.

11. The computer-implemented method of claim 10, further comprising ensuring that no sample of a particular coverage block from among the plurality of coverage blocks has live coverage when a primitive index stored in the PIT associated with the particular coverage block does not match at least one corresponding primitive index stored in the TCPM.

12. The computer-implemented method of claim 10, further comprising updating one or more positions within the TCPM corresponding to live samples of a particular coverage block from among the plurality of coverage blocks having a corresponding index in the PIT.

13. The computer-implemented method of claim 1, further comprising interacting with the TCPM, by the ECD logic section, when the FIFO buffer receives a new coverage block from among the plurality of coverage blocks.

14. The computer-implemented method of claim 1, further comprising:
   causing, by the CBI logic section, the FIFO buffer to be drained; and
   sharing, by the ECD logic section, hardware used by quad merge.

15. The computer-implemented method of claim 14, further comprising sending, by the ECD logic section, the plurality of coverage blocks to a post-sample shader storage of the rasterization control flow logic section of the GPU after the plurality of coverage blocks exit the FIFO buffer.

16. The computer-implemented method of claim 1, further comprising inserting the plurality of coverage blocks rate into the ECD logic section is in constant time O(1).

* * * * *